United States Patent [19]
Lee

[11] Patent Number: 5,784,221
[45] Date of Patent: Jul. 21, 1998

[54] HUB LOCK RELEASING DEVICE OF TAPE RECORDER

[75] Inventor: Jung-rak Lee, Suwon, Rep. of Korea

[73] Assignee: Samsung Electronics Co., Ltd., Kyungki-Do, Rep. of Korea

[21] Appl. No.: 856,148

[22] Filed: May 14, 1997

[30] Foreign Application Priority Data

Aug. 21, 1996 [KR] Rep. of Korea .................. 1996-34744

[51] Int. Cl.⁶ ........................................... G11B 23/02
[52] U.S. Cl. ................................. 360/93; 360/132
[58] Field of Search ........... 360/132, 93; 242/343–343.2

[56] References Cited

U.S. PATENT DOCUMENTS 4,579,295  4/1986  Harada ..................... 360/132 X
5,224,005  6/1993  Fujii ........................... 360/132
5,433,398  7/1995  Sawada ..................... 242/343.2

*Primary Examiner*—John H. Wolff
*Attorney, Agent, or Firm*—Sughrue, Mion, Zinn, Macpeak & Seas, PLLC

[57] ABSTRACT

A hub lock releasing device of a tape recorder is provided. The hub lock releasing device includes a slide member slidingly installed on a deck and having a releasing pin, a spring for elastically biasing the slide member, an interlocking member interlocked with the slide member, and a cam gear having an interlocking pin being selectively in contact with the interlocking member to rotate the interlocking member. When the cam gear rotates the interlocking pin is detached from the interlocking member, thus the interlocking member rotates and the slide member is moved by the elastic force of the spring and the releasing pin pushes the hub locking member to release the locking of the hub.

5 Claims, 6 Drawing Sheets

5,784,221

HUB LOCK RELEASING DEVICE OF TAPE RECORDER

BACKGROUND OF THE INVENTION

The present invention relates to a hub lock releasing device of a tape recorder, and more particularly, to a hub lock releasing device of a tape recorder having an improved structure in which unstable loading of the tape cassette and noise caused by releasing the hub-locking is prevented.

A tape cassette used for a tape recorder such as a VCR, a camcorder or a digital audio tape recorder (R-DAT) which records/reproduces information on/from a magnetic tape includes, as shown in FIG. 1, a hub locking member 5. The hub locking member 5 locks hubs 2 and 3 on which a magnetic tape "T" is wound so to prevent rotation thereof and thus to prevent the magnetic tape from loosening. That is, a locking groove 4 is formed on the bottom of the tape cassette, and the hub locking member 5 is slidingly installed in the locking groove 4. A lower end of the hub locking member 5 is elastically supported by a spring 6 fixed to a tape cassette 7, and an upper end thereof is connected with locking arms 5a and 5b elastically connected with teeth of the hubs 2 and 3. In a state in which the tape cassette 7 is not loaded in the tape recorder (not shown), the locking arms 5a and 5b are connected with the teeth of the hubs 2 and 3 by an elastic force of the spring 6. Accordingly, the hubs 2 and 3 are not driven and thus the magnetic tape "T" is not loosened.

In order to load and operate the above-described tape cassette in a tape recorder, the tape recorder should include a lock releasing means for releasing the hub from a locked state.

FIG. 2 shows an embodiment of a conventional lock releasing means. Referring to FIG. 2, in the lock releasing means, a support plate 12 is installed on a loading motor 11 fixed on a deck 10, and a releasing pin 13 protrudes from the support plate 12. The releasing pin 13 is inserted in the locking groove 4 of FIG. 1, when the tape cassette 7 (see FIG. 1) is received in a cassette holder 14 to be placed on a reel table 16. That is, as shown in FIG. 3A, when the tape cassette 7 is loaded to descend in the direction indicated by arrow "A", a first incline 13a formed on the releasing pin 13 and a second incline 5c formed in the lower end of the hub locking member 5 slide while in contact with each other. Accordingly, a spring 6 supporting the hub locking member 5 is depressed to locate the hub locking member 5 in a position as shown in FIG. 3B. At this time, the locking arms 5a and 5b shown in FIG. 1 are detached from the teeth of the hubs 2 and 3 to release the hubs 2 and 3 from their locked state. Also, a settling pin 15 of FIG. 2 installed on the deck 10 inserts in a fixing hole 8 of FIG. 1 formed on the tape cassette to stably fix the tape cassette.

In the above-described hub lock releasing device, before the tape cassette is stably settled by the settling pin 15, the releasing pin 13 and the hub locking member 5 slide against each other, to thereby push the tape cassette in one direction. Accordingly, the tape cassette does not properly settle on the deck, which causes operational failure or noise.

SUMMARY OF THE INVENTION

It is an object of the present invention to provide a hub lock releasing device of a tape recorder having an improved structure for a tape cassette such that the tape cassette does not move when settled on a deck.

To accomplish the above object of the present invention, there is provided a hub lock releasing device of a tape recorder which elastically moves a hub locking member to prevent the hub of the tape cassette from being rotated, comprising: a slide member slidingly installed on a deck and having a releasing pin for moving the hub locking member; a spring for elastically biasing the slide member in a direction opposite of the pushing direction of the hub locking member; an interlocking member rotatably connected with the deck and interlocked with the slide member; and a cam gear installed on the deck and rotated by a driving motor, and having an interlocking pin being selectively in contact with the interlocking member to rotate the interlocking member, wherein when the cam gear rotates and accordingly the interlocking pin is detached from the interlocking member, the interlocking member rotates and the slide member is moved by the elastic force of the spring and accordingly the releasing pin pushes the hub locking member to release the locking of the hub.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 4:
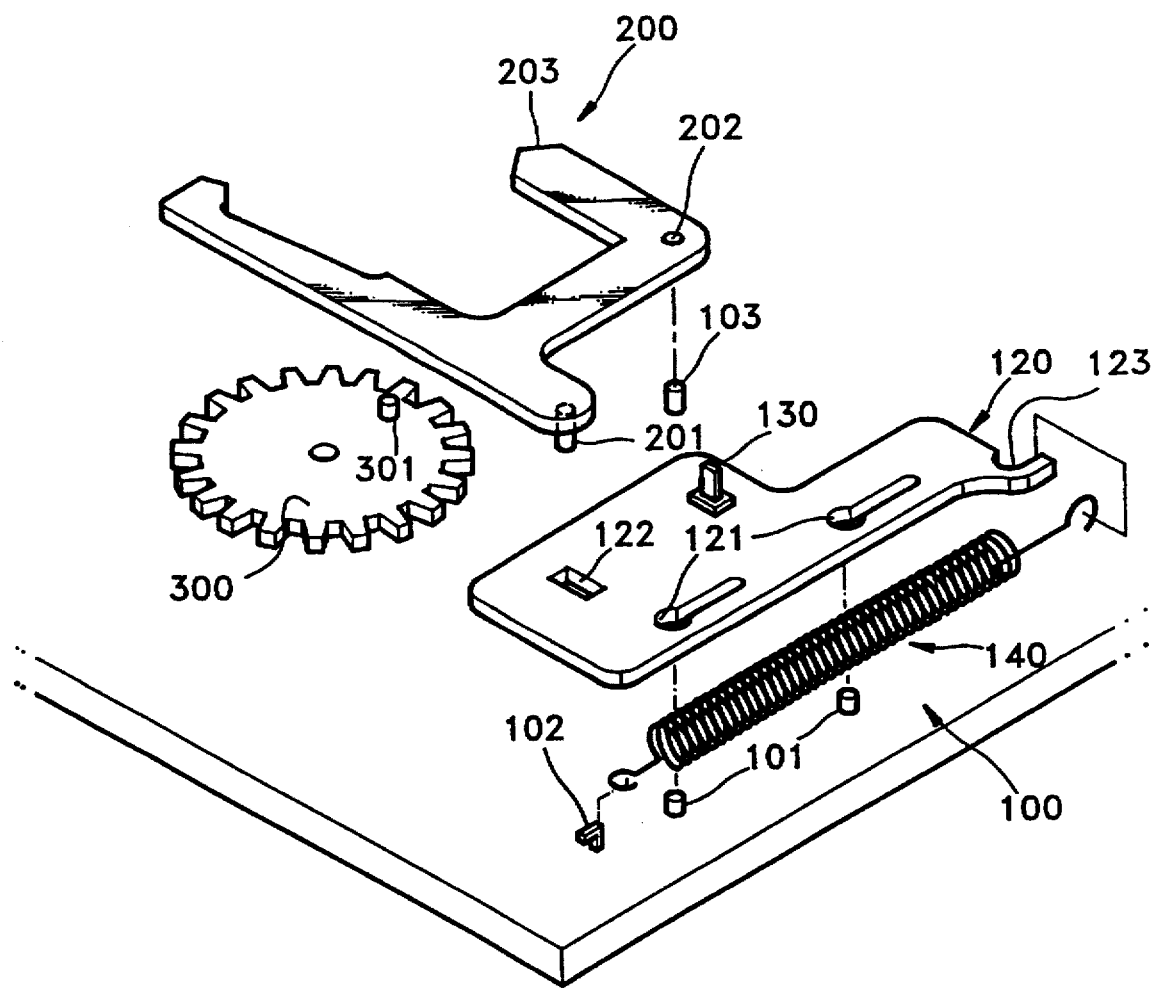
FIG. 4 is an exploded perspective view showing a hub lock releasing device of a tape recorder according to the present invention.

Referring to FIG. 4, a hub lock releasing device of a tape recorder according to the present invention includes a cam gear 300 driven by a driving motor (not shown) and having a protruded interlocking pin 301, and an interlocking member 200 having a contact surface 203 contacting the interlocking pin 301. The interlocking member 200 has a coupling hole 202 inserted in a rotating shaft 103 formed on a deck 100. The interlocking member 200 rotates around the rotating shaft 103 according to the movement of the interlocking pin 301. A coupling protrusion 201 for contacting with a slide member 120 is formed under the interlocking member 200.

Figure 1:
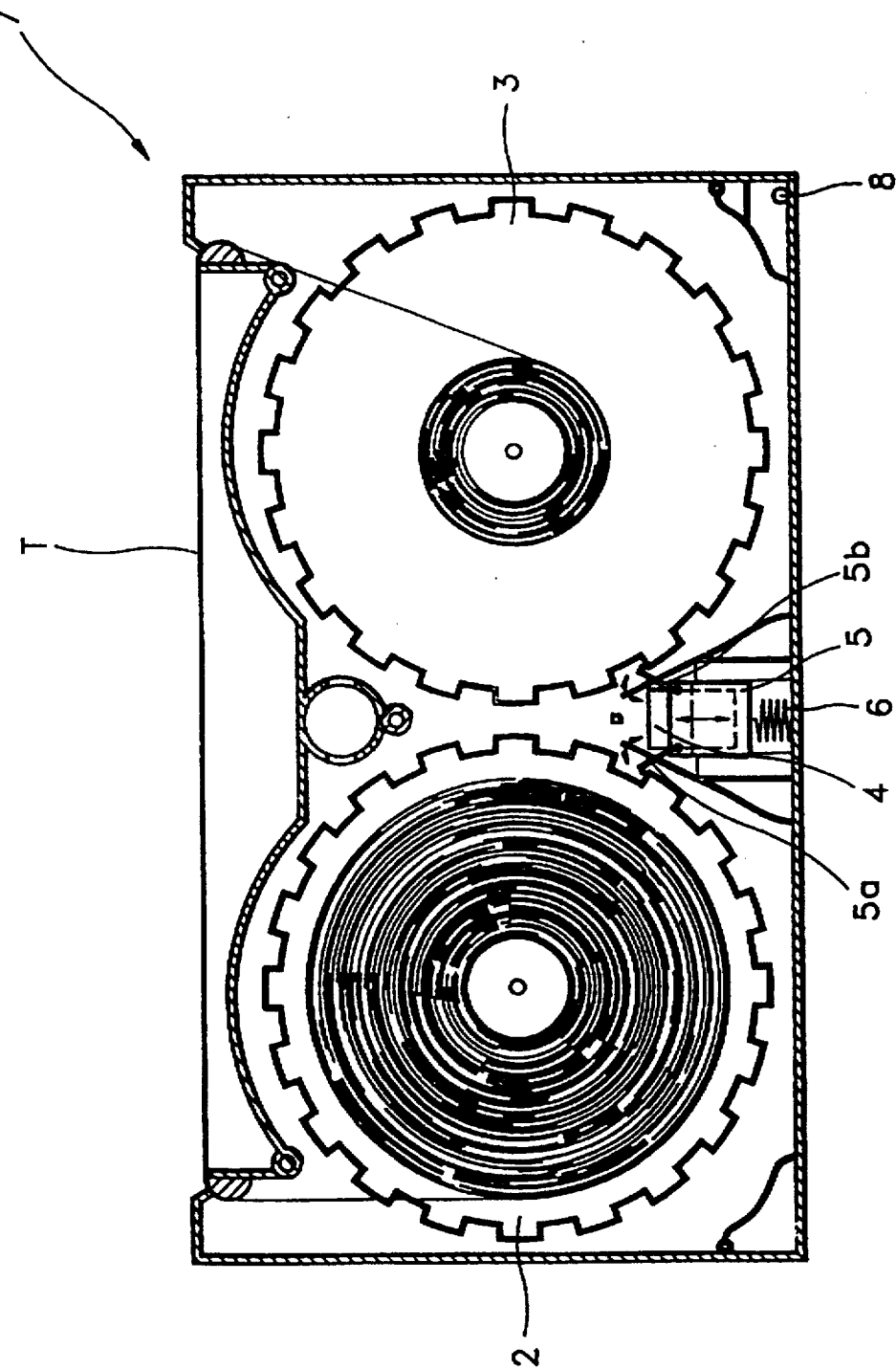
FIG. 1 is a plan view showing the structure of a general tape cassette.

The slide member 120 is slidingly disposed on the deck 100, and the slide member 120 includes a plurality of guide slots 121, a coupling slot 122 in which the coupling protrusion 201 of the interlocking member 200 is inserted, and a releasing pin 130 for pressing the hub locking member 5 (see FIG. 1) of the tape cassette. Guide protrusions 101 which insert into the guide slots 121 are formed on the deck 100.

Also, a spring 140 is connected between a first hooking piece 123 formed on one side of the slide member 120 and a second hooking piece 102 formed on the deck 100.

The operation of the hub lock releasing device of the above tape recorder according to the present invention will be described with reference to FIGS. 5A through 6B.

Figure 5A:
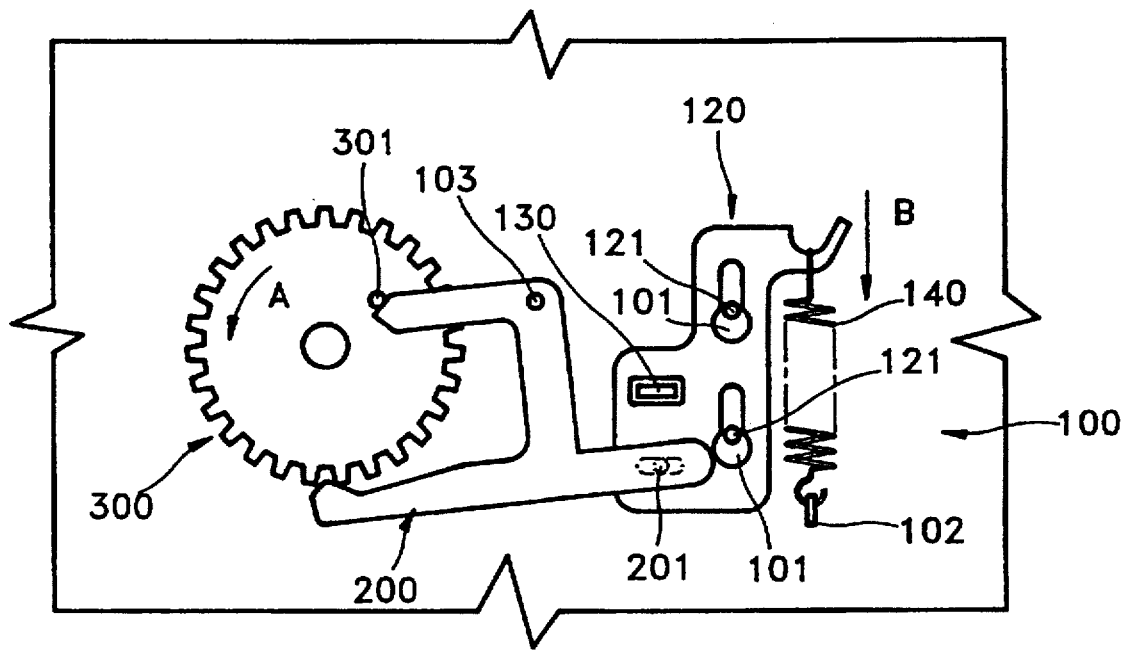
FIGS. 5A and 5B are a plan view and a sectional view schematically showing the locked state of a hub lock releasing device of a tape recorder according to the present invention, respectively.
Figure 5B:
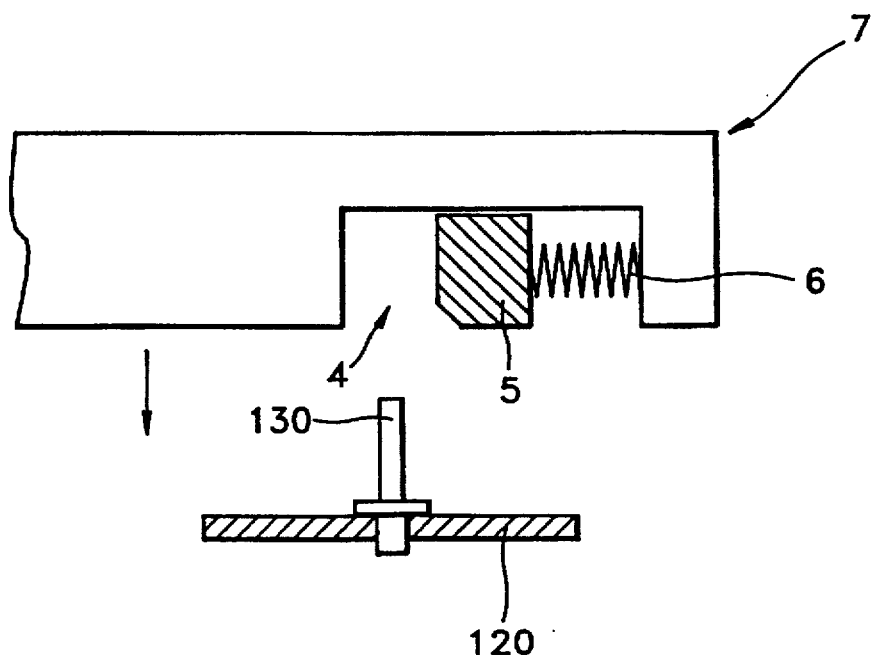

As shown in FIG. 5B, the hubs 2 and 3 (see FIG. 1) are in a locked state until the tape cassette 7 is completely loaded on the tape recorder.

At this time, the hub lock releasing device is in the state shown in FIG. 5A. That is, the interlocking pin 301 of the cam gear 300 contacts the contact surface 203 of the interlocking member 200, and the interlocking member 200 has been rotated around the rotating shaft 103 at a predetermined angle. Accordingly, the slide member 120 connected with the interlocking member 200 by the coupling protrusion 201 is in a state of having been moved upward. At this time, the slide member 120 is elastically biased by the spring 140 in the direction indicated by arrow "B".

Figure 6A:
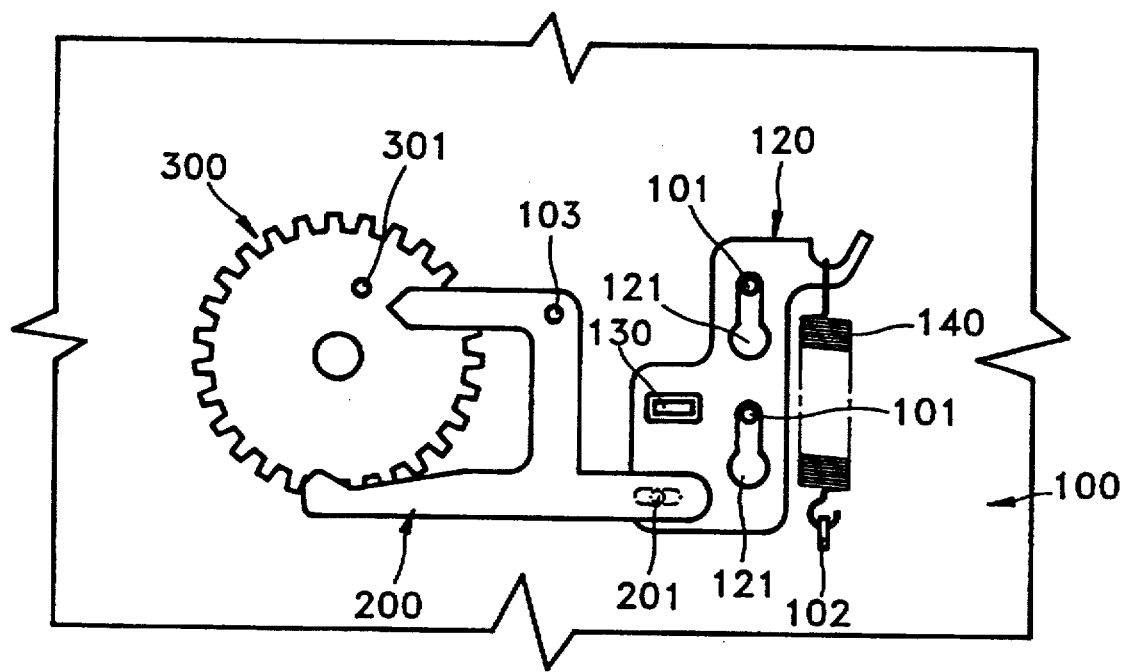
FIGS. 6A and 6B are plan and sectional views schematically showing the released state of a hub lock releasing device of a tape recorder according to the present invention, respectively.
Figure 6B:
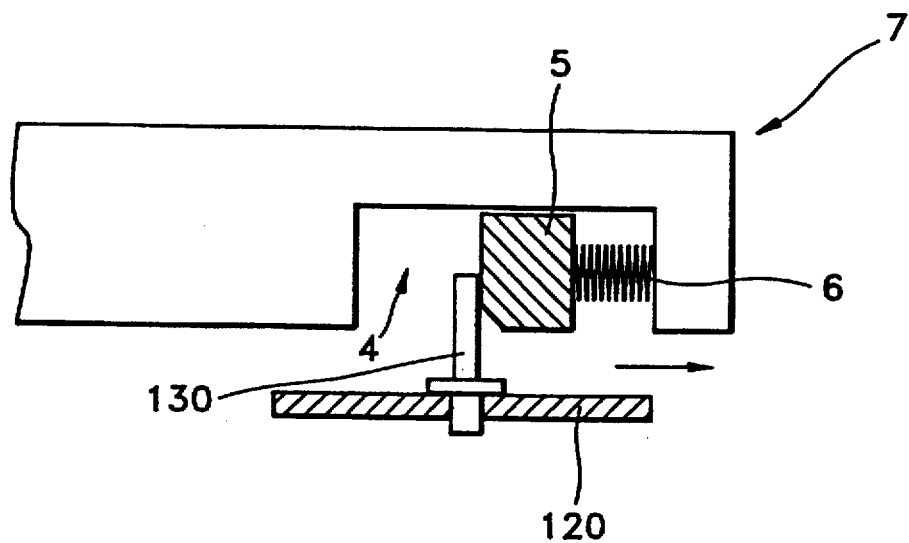

When the tape cassette 7 settles on the deck 100, the releasing pin 130 formed on the slide member 120 inserts into the locking groove 4. Then, the cam gear 300 rotates in the direction indicated by arrow "A" and accordingly the interlocking pin 301 pressed on the contact surface 203 of the interlocking member 200 also rotates counterclockwise to be detached from the contact surface 203, as shown in FIG. 6A. Accordingly, the pressure of the interlocking pin 301, which balances with elastic force of the spring 140, is removed, so that the slide member 120 moves downward along the guide protrusion 101. The interlocking member 200 also rotates clockwise around the rotating shaft 103 to be in the state shown in FIG. 6A. According to above operation, the releasing pin 130 protruding from the slide member 120 moves the hub locking member 5, as shown in FIG. 6B, to release the locking of the tape cassette 7.

In order to eject the tape cassette 7, since the cam gear 300 rotates in a direction opposite to arrow "A" shown in FIG. 5A, the interlocking pin 301 contacts the interlocking member 200 to rotate the interlocking member 200 counterclockwise. Accordingly, the slide member 120 moves upward and the releasing pin 130 does not press the hub locking member 5, to thereby release the locking.

As described above, according to the hub lock releasing device of the present invention, the tape cassette 7 is settled on the deck 100 and then the hub locking member 5 is moved to release the locking. Accordingly, the tape cassette 7 can be prevented from moving as the locking is released.

Figure 2:
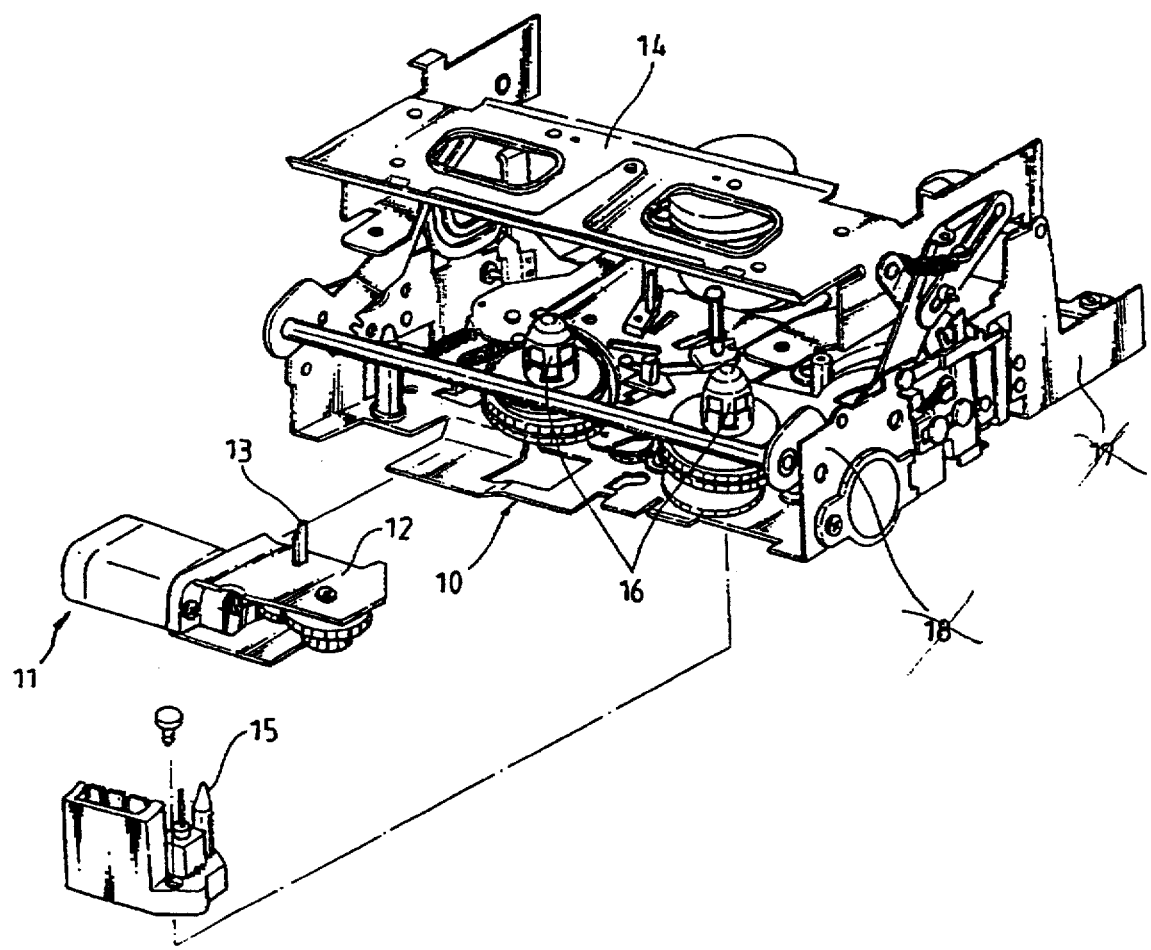
FIG. 2 is a partially exploded perspective view of a tape recorder employing a conventional hub lock releasing device.
Figure 3A:
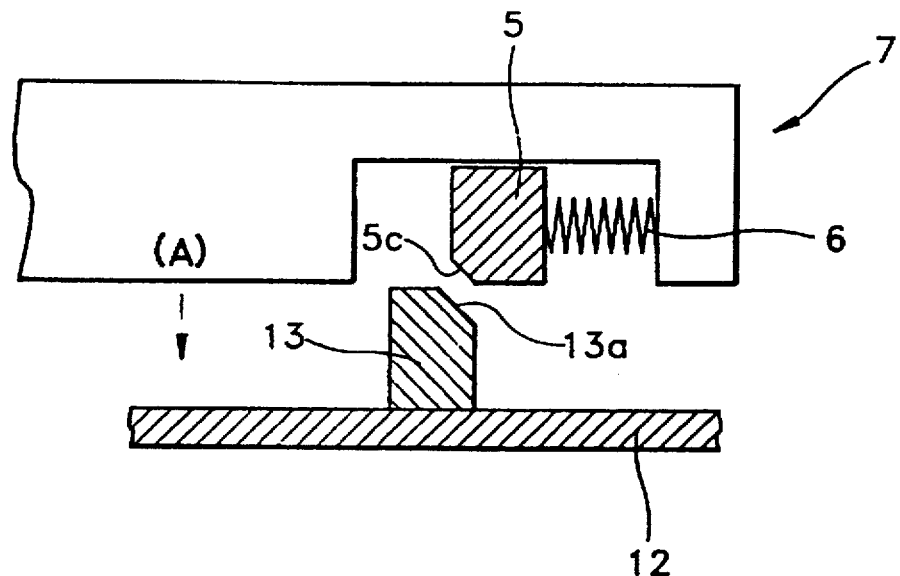
FIGS. 3A and 3B are sectional views for illustrating the operation of a conventional hub lock releasing device.
Figure 3B:
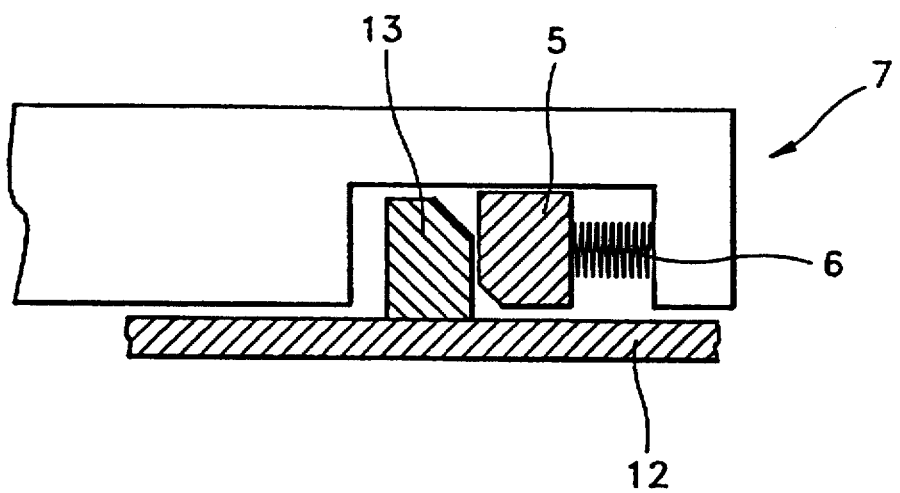

Also, since the hubs 2 and 3 (see FIG. 1) can be selectively locked or released after the tape cassette 7 is settled on a reel table 16 of the tape recorder (see FIG. 2), the hub lock releasing device acts as the reel brakes. That is, the hubs 2 and 3 of the tape cassette 7 are locked or release the hubs from their locked state according to the rotating direction of the cam gear 300, so that, if necessary, the hubs 2 and 3 can be locked to stop the reel table 16 where the hubs 2 and 3 are settled. Accordingly, the hub lock releasing device can replace the reel brakes for braking the reel table 16.

According to the hub locking release device of the present invention, the tape cassette is released from its locked state after loading so that the tape cassette can be prevented from being moved during loading. Accordingly, noise and operational failure caused by misplacement of the tape cassette can be prevented.

Also, the hub lock releasing device acting as a reel brake for stopping the reel table does not require special reel brakes, to thereby reduce the number of components.

While the invention has been described with reference to a preferred embodiment, it should be apparent to those skilled in the art that many changes and modifications may be made without departing from the spirit and scope of the invention as defined in the claims.

What is claimed is:

1. A hub lock releasing device of a tape recorder, which includes a deck, for moving a hub locking member of a tape cassette having a hub so as to release the hub from a locked state, said hub lock releasing device comprising:

a slide member slidingly installed on the deck and having a releasing pin for moving said hub locking member;

a spring for elastically biasing said slide member in a direction opposite the pushing direction of said hub locking member;

an interlocking member rotatably connected with said deck and interlocked with said slide member; and a cam gear installed on said deck and rotated by a driving motor, and having an interlocking pin being selectively in contact with said interlocking member to rotate said interlocking member, wherein when said cam gear rotates and said interlocking pin is detached from said interlocking member, said interlocking member rotates and said slide member is moved by the elastic force of said spring and said releasing pin pushes said hub locking member to release the locking of said hub.

2. A hub lock releasing device according to claim 1, wherein a plurality of guide slots are formed on said slide member, and a plurality of protrusions which slidingly insert into the guide slots are formed on the deck.

3. A hub lock releasing device according to claim 1, wherein a coupling protrusion is formed at the bottom of said interlocking member, and a coupling slot for inserting said coupling protrusion is formed on said slide member.

4. A hub lock releasing device according to claim 1, further comprising a rotating shaft formed on the deck, and a coupling hole formed on said interlocking member wherein said rotating shaft is inserted through said coupling hole for rotation of said interlocking member.

5. A hub lock releasing device according to claim 1, further comprising a first hooking piece formed on said slide member and a second hooking piece formed on the deck wherein said spring is connected between said first and second hooking pieces.

* * * * *